(12) United States Patent
Shimada

(10) Patent No.: US 7,054,997 B2
(45) Date of Patent: May 30, 2006

(54) DISK ARRAY SYSTEM AND CACHE CONTROL METHOD

(75) Inventor: Kentaro Shimada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 246 days.

(21) Appl. No.: 10/219,768

(22) Filed: Aug. 16, 2002

(65) Prior Publication Data

US 2003/0221062 A1 Nov. 27, 2003

(30) Foreign Application Priority Data

May 24, 2002 (JP) ............................ P2002-150045

(51) Int. Cl.
*G06F 12/00* (2006.01)
(52) U.S. Cl. ...................... 711/114; 711/113
(58) Field of Classification Search ................ 711/111, 711/112, 114, 141–148; 709/213–216
See application file for complete search history.

(56) References Cited

U.S. PATENT DOCUMENTS

| | | | | |
|---|---|---|---|---|
| 5,459,856 A * | 10/1995 | Inoue | ...................... | 711/113 |
| 5,689,729 A * | 11/1997 | Inoue | ...................... | 710/52 |
| 5,951,655 A * | 9/1999 | Inoue | ...................... | 710/37 |
| 5,987,477 A * | 11/1999 | Schmuck et al. | ............ | 707/201 |
| 6,185,658 B1 * | 2/2001 | Arimilli et al. | ............ | 711/133 |
| 6,243,795 B1 * | 6/2001 | Yang et al. | ................ | 711/159 |
| 6,351,791 B1 * | 2/2002 | Freerksen et al. | .......... | 711/146 |
| 6,378,039 B1 * | 4/2002 | Obara et al. | ................ | 711/114 |
| 6,446,237 B1 * | 9/2002 | Menon | ........................ | 714/800 |
| 6,574,709 B1 * | 6/2003 | Skazinski et al. | ........... | 711/119 |
| 6,587,919 B1 * | 7/2003 | Yanai et al. | ................ | 711/112 |
| 6,647,461 B1 * | 11/2003 | Fujimoto et al. | ........... | 711/114 |
| 6,647,474 B1 * | 11/2003 | Yanai et al. | ................ | 711/162 |
| 6,671,782 B1 * | 12/2003 | Menon | ........................ | 711/145 |
| 6,766,414 B1 * | 7/2004 | Francis et al. | .............. | 711/113 |
| 6,775,739 B1 * | 8/2004 | Bachmat et al. | ............ | 711/114 |
| 6,816,891 B1 * | 11/2004 | Vahalia et al. | .............. | 709/214 |
| 6,832,291 B1 * | 12/2004 | Lee | ............................ | 711/114 |
| 6,883,064 B1 * | 4/2005 | Yoshida et al. | .............. | 711/114 |

FOREIGN PATENT DOCUMENTS

| | | |
|---|---|---|
| JP | 07-200403 | 12/1993 |
| JP | 07-328072 | 6/1994 |
| JP | 10-063576 | 8/1996 |
| JP | 10-254779 | 3/1997 |
| JP | 11-203201 | 1/1998 |
| JP | 2001-034597 | 7/1999 |
| JP | 2001-290790 | 4/2000 |

* cited by examiner

*Primary Examiner*—T Nguyen
(74) *Attorney, Agent, or Firm*—Reed Smith LLP; Stanley P. Fisher, Esq.; Juan Carlos A. Marquez, Esq.

(57) ABSTRACT

Disclosed is a disk array system that can be expanded effectively in scale by increasing the number of input/output channels and disk adapters and improved in such performance as the number of input/output operations per second, data transfer rate. The disk array system is provided with input/output channels to be coupled to a host computer, cache memories coupled to each of input/output channels respectively and used to store input/output data temporarily, disk drives, disk adapters coupled to the disk drives, and network switches used to couple the input/output channels to the disk adapters.

14 Claims, 8 Drawing Sheets

FIG. 6

| DATA BLOCK NUMBER | DISK ADAPTOR NUMBER |
|---|---|
|  |  |
|  |  |
|  |  |

FIG. 7

| DATA BLOCK NUMBER | DISK DRIVE NUMBER | DATA LOCATION | INPUT/OUTPUT CHANNEL NUMBER |
|---|---|---|---|
|  |  |  |  |
|  |  |  |  |
|  |  |  |  |

FIG. 8

| INVALIDATA COMMAND CODE | DATA BLOCK NUMBER |
|---|---|

FIG. 9

| UPDATE COMMANDCODE | DATA BLOCK NUMBER | UPDATE DATA |
|---|---|---|

DISK ARRAY SYSTEM AND CACHE CONTROL METHOD

BACKGROUND OF THE INVENTION

1. Field of the Invention

The present invention relates to a disk array system, in particular, to a configuration of a cache memory employed for the disk array system and a control method for the cache memory.

2. Description of Related Art

Conventional disk array systems have a cache memory between disk array adapters coupled to plural disk drives and input/output channels coupled to host computers. Such a cache memory, which can be read/written much faster than the disk drives, stores data to be read/written from/into the disk drive to improve such performance as the data transfer rate, and input/output operations per second. JP-A 233201/1999 and JP-A 290790/2000 disclose such conventional disk array systems.

Some of the conventional disk array systems have physically plural cache memories to improve the reliability of their systems.

Even in this configuration of a system, the plural cache memories is controlled as a single united cache memory. When data is written, the same data need to be written into all of the plural cache memories. In particular, the cache memory disclosed in JP-A 203201/1999, which stores data to be written in a disk drive, is also physically composed of a single non-volatile cache memories.

In those configurations, however, it is difficult to improve the performance of the system including input/output operations per second, since the cache memory is shared among plural input/output channels, thereby accesses of those channels to the cache memory often collide with each other.

Furthermore, because all the input/output channels as well as all the disk adapters must be coupled to the single cache memory, it is difficult to enlarge the disk array system by increasing the number of input/output channels and the number of disk adapters.

Furthermore, because the data must be read from a disk drive to a disk adapter, then passed to the cache memory and then passed to the input/output channel, the path includes many steps and the data input/output takes much time, thereby the data transfer rate cannot be improved so much.

SUMMARY OF THE INVENTION

Under such circumstances, it is an object of the present invention to make it easier to enlarge a disk array system by increasing the number of input/output channels, as well as the number of disk adapters. It is another object of the present invention to improve the performance of the disk array system itself such as input/output operations per second and data transfer rate.

To achieve these objects, in one preferred aspect of the invention, the disk array system has a plurality of input/output channels used for communications with host computers, cache memories coupled to each of the plurality of input/output channels and used to store input/output data temporarily, one or more disk drives, one or more disk adapters coupled to the one or more disk drives, and one or more networks used to couple the plurality of input/output channels to the one or more disk adapters.

In another aspect, in the disk array system with a plurality of disk adapters, each of the plurality of input/output channels includes a destination disk adapter determining measure that determines which disk drive stores requested data and which disk adapter is coupled to the disk drive upon receiving a data request from the host computer.

In still another aspect, each of the disk adapters includes an input/output channel recording measure that records information denoting which of the plural input/output channels couples the cache memory that stores the data read from the disk drive coupled to the disk adapter.

In yet another aspect, the disk adapter includes a cache invalidating measure that sends invalidation command to the cache memory according to the data recorded by the destination channel recording measure so as to invalidate the data read from the disk drive provided in the cache memory.

In further aspect, the disk adapter includes a cache updating measure that finds the cache memory that stores original data to be updated when the data stored in the disk drive is updated according to the data recorded by the destination channel recording measure and updates the original data stored in the cache memory.

Other and further objects, features and advantages of the invention will appear more fully from the following description.

BRIEF DESCRIPTION OF THE DRAWINGS

FIG. 6 is an example of a data table format that determines a disk adapter number according to a data block number in an input/output channel;

FIG. 7 is an example of a data table format that determines a disk drive according to a data block number in a disk adapter;

FIG. 8 is an example of an invalidate command format used for a cache memory, sent to an input/output channel from a disk adapter;

FIG. 9 is an example of an update command format used for a cache memory, sent to an input/output channel from a disk adapter;

DETAILED DESCRIPTION OF THE PREFERRED EMBODIMENTS

Hereunder, the preferred embodiment of the invention will be described with reference to the accompanying drawings.

Figure 1:
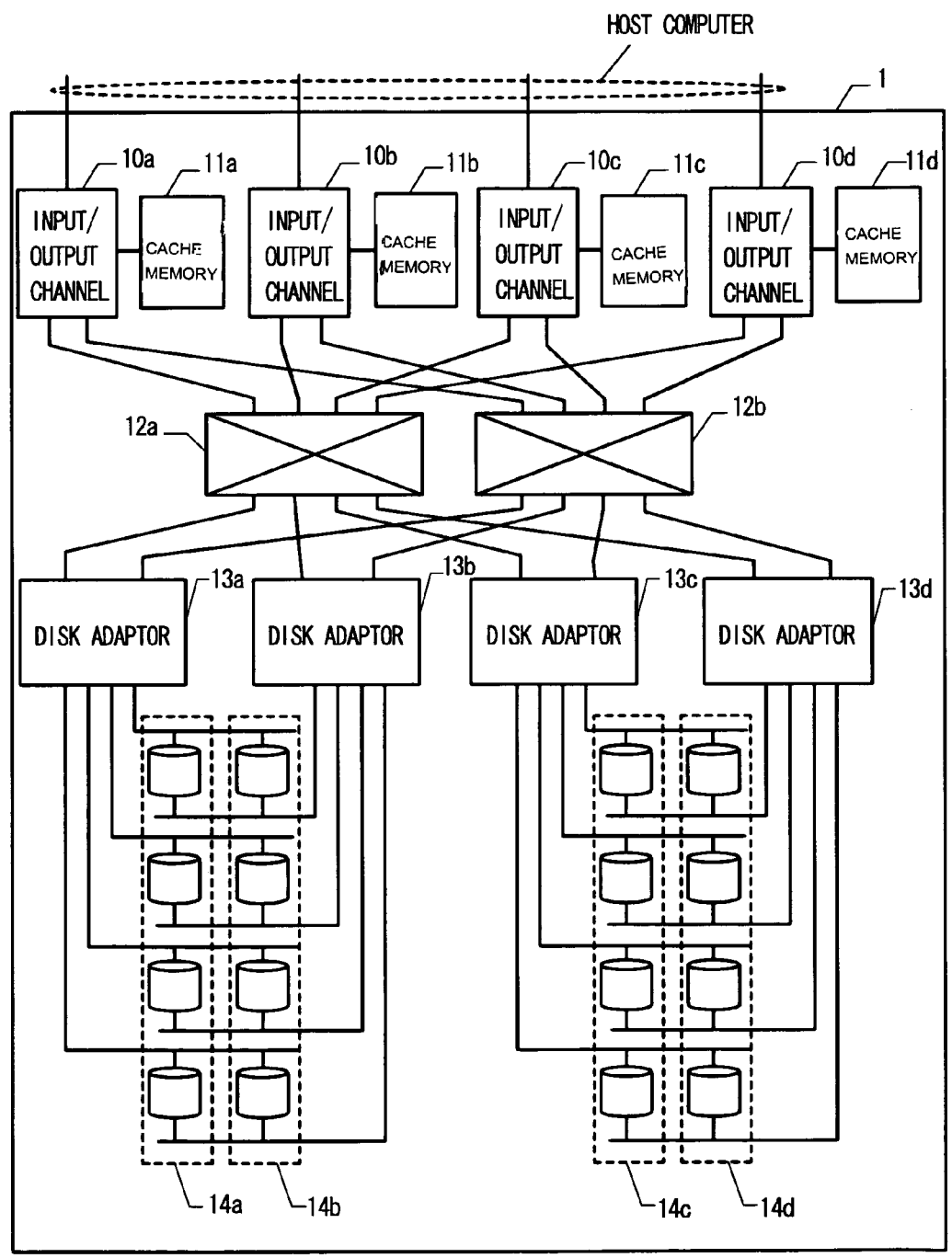
FIG. 1 is an embodiment of a disk array system of the invention.

FIG. 1 is a block diagram of a disk array system in a preferred embodiment of the invention.

In FIG. 1, the disk array system 1 has, four input/output channels 10a to 10d coupled to external appliances (host computers) to send/receive data to/from the host computer, four cache memories 11a to 11d coupled to the input/output channels 10a to 10d each to store input/output data temporarily so as to speed up data transfer, four disk drives 14a to 14d, four disk adapters 13a to 13d coupled to the disk drives 14a to 14d to read/write data from/to the disk drives, and two network switches 12a and 12b to couple the input/output channels 10a to 10d to the disk adapters 13a to 13d.

The disk array system 1 shown in FIG. 1 has two network switches 12a and 12b in order to improve the data transfer rate between each of the input/output channels 10a to 10d and each of the disk adapters 13a to 13d and in order to improve reliability. There is some redundancy in the path between the input/output channel 10a to 10d and the disk adapter 13a to 13d.

In FIG. 1, any of the four input/output channels 10a to 10d can receive data requests (read request) from the host computer.

While it is assumed here that the input/output channel 10a receives the read requests, other input/output channels 10a to 10d also operate similarly.

Receiving a data request, at first the input/output channel 10a checks its coupled cache memory 11a for the presence of the requested data.

Predetermined data block numbers are used between the disk array system and the host computers so as to identify each requested data.

When the requested data is found in the cache memory 11a, the input/output channel 10a reads the data from the cache memory 11a and sends the data to the host computer.

The input/output channel 10a needs only to check the cache memory 11a coupled to itself; the input/output channel 10a does not need to make any other data communication or wait for data. Consequently, the data transfer is speeded up significantly.

According to any of the previously described conventional techniques disclosed in the official gazettes of JP-A No. 203201/1999 and JP-A No. 290790/2001, it takes much time to read data from a cache memory, since the reading is done through a switch provided between the cache memory and the subject input/output channel. In addition, when one cache memory is checked for data presence from plural input/output channels and/or when data is read from the cache memory by those channels, a conflict often occurs among the accesses from those channels, thereby the accesses would be suspended.

On the other hand, the presented invention can speed up the processing about three to five times faster than any of the conventional ones, since the invention includes no such reasons that might cause the performance degradation.

For example, in the above-described conventional examples, at least four times of communications are required for an input/output channel to read data from a cache memory, since the read request is sent from an input/output channel to a switch, then from the switch to a cache memory, and furthermore, the data read from the cache memory is sent to a switch, then from the switch to the input/output channel. When a conflict occurs in the course, the data reading will further be delayed.

In the disk array system in the embodiment of the invention shown in FIG. 1, by contrast, the input/output channel 10a reads data directly from the cache memory 11a coupled to itself, thereby the data communication is made just twice. In addition, the reading path is short and no conflict occurs in the path.

When the requested data is not found in the cache memory 11a, the input/output channel 10a determines which one of the disk adapters 13a to 13d is coupled to the disk drive that stores the requested data according to the requested data block number, and sends the data request to the disk adapter.

In this example, it is assumed that the disk drive coupled to the disk adapter 13a stores the requested data.

At this time, the input/output channel 10a uses the network switch 12a or 12b to send the data request to the disk adapter 13a.

Receiving the data request, the disk adapter 13a determines which of the disk drives 14a and 14b stores the data according to the data block number, then reads the data therefrom.

At the same time, the disk adaptor 13a checks if the requested data has been sent to any of the other input/output channels 10b to 10d. If the check result is YES, the disk adaptor 13a sends an invalidate command to the channels 10b to 10d to delete the data from the cache memories 11b to 11d coupled to each of them.

In the above case, when the requested data found in the cache memories 11b to 11d is modified and the modified data has not yet been written back in the disk drive, the disk adapter 13a receives the modified data from the cache memories 11b to 11d through the input/output channels 10b to 10d, then overwrites the modified data on the data read newly from a disk drive.

After this, the disk adapter 13a sends the data to the input/output channel 10a.

The disk adapter 13a then records that the data has been sent to the input/output channel 10a so as to reflect the fact in the subsequent processing.

When the overwriting is done on the data read from a disk drive, the disk adapter 13a writes back the overwritten data to the disk drive.

The input/output channel 10a, when receiving the data from the disk adapter 13a, sends the data to the host computer and also stores the data in the cache memory 11a coupled to itself.

The input/output channel 10a, when receiving a write request from the host computer, checks its coupled cache memory 11a for the presence of the data having the received data block number similarly to the response to a read request. When the data is found in the cache memory 11a, the input/output channel 10a updates the data in the cache memory 11a.

The updated data is sent to the disk adapter 13a, then written back to the necessary disk drives, for example, after a preset time is up, when the cache memory 11a becomes full, or when the input/output channel 10a receives an invalid command from the disk adapter 13a because of a data request issued by one of the other input/output channels 10b to 10d to the data of the same data block number.

When the requested data is not found in the cache memory 11a, the disk adapter 13a reads the data from a disk, then sends the data to the input/output channel 10a similarly to the above processing for a read request.

The input/output channel 10a then stores the data received from the disk adapter 13a in the cache memory 11a, then writes the write data received from the host computer in the required data blocks, thereby the data therein is updated.

The processing of the input/output channel 10a after the data updating is similar to those executed when the original data is found in the cache memory 11a.

Figure 2:
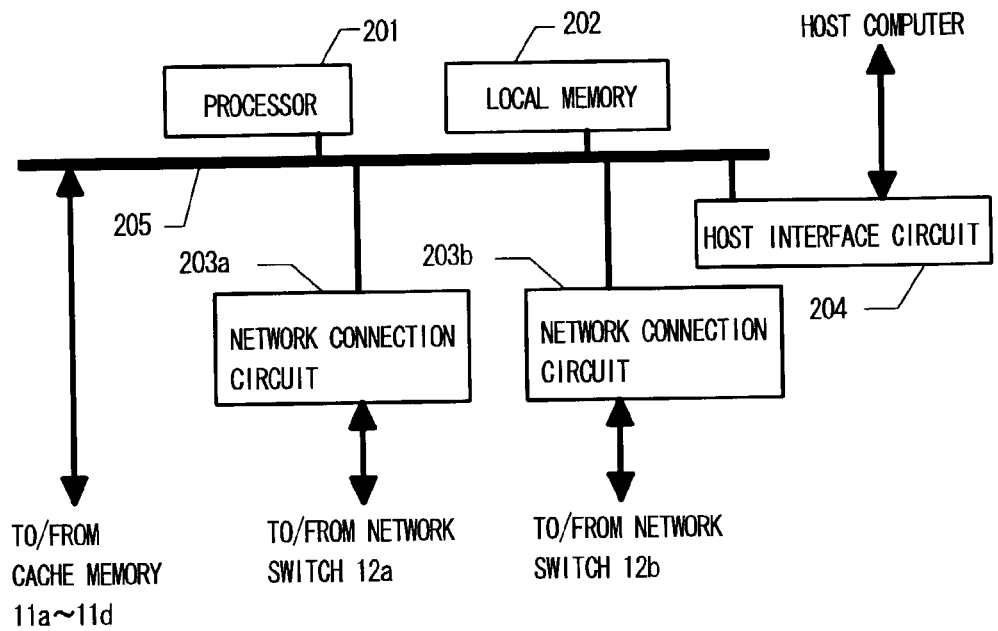
FIG. 2 is an embodiment of an input/output channel used for the disk array system of the invention.

FIG. 2 is a block diagram of each of the input/output channels 10a to 10d usable in the embodiment of the invention shown in FIG. 1.

In FIG. 2, the input/output channels 10a to 10d are respectively provided with a processor 201 used as a control unit for controlling its processing.

Each of the input/output channels 10a to 10d is also provided with a local memory 202 for storing a control program to be executed by the processor 201, as well as information (data) required for its processing.

The disk array system is further provided with a host interface circuit 204 for coupling itself to the host computer and network couple ion circuits 203a and 203b for coupling itself to network switches 12a and 12b.

Those devices are coupled to the processor 201 through a processor bus 205, which is a fast signal line bus. Further, the cache memories 11a to 11d are also coupled to the processor bus 205.

Consequently, the processor 201 can read/write data from/to the cache memory 11a to 11d very fast.

In the embodiment shown in FIG. 2, it is expected that the processor 201 executes the control program stored in the local memory 202 to execute the functions of the input/output channels.

On the other hand, some or all the functions of the control program can be implemented as a hardware item instead.

Figure 3:
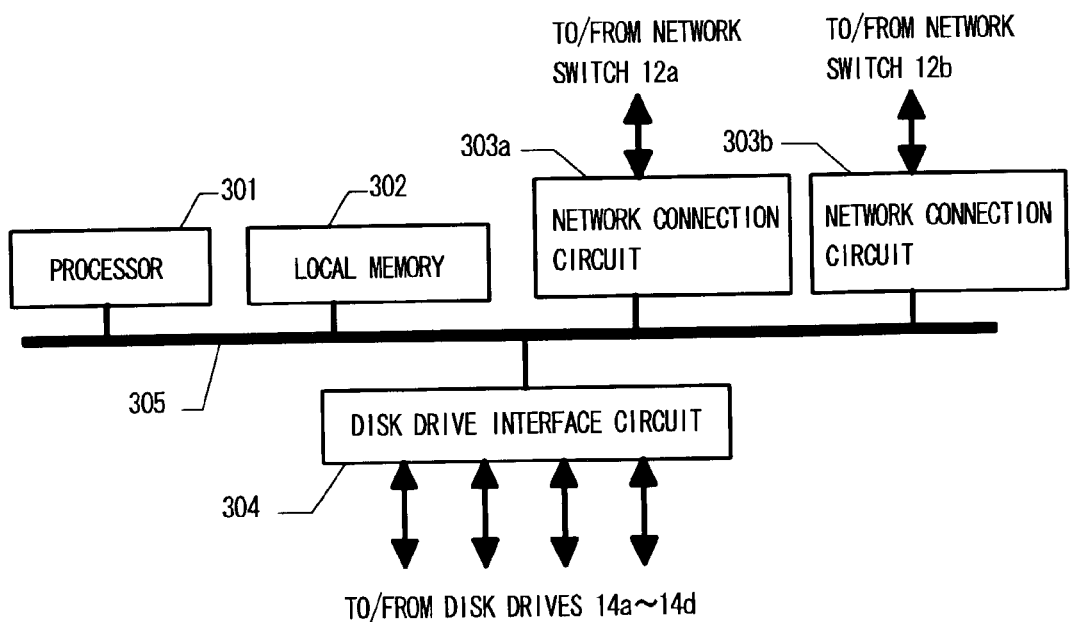
FIG. 3 is an embodiment of a disk adapter used for the disk array system of the invention.

FIG. 3 is a block diagram of each of the disk adapters 13a to 13d usable in the embodiment of the invention shown in FIG. 1.

In FIG. 3, the disk adapter is provided with a processor 301 used as a control unit for controlling its processing.

The disk adapter is also provided with a local memory 302 for storing a control program to be executed by the processor 301, as well as information (data) required for its processing.

The disk adapter is further provided with a disk drive interface circuit 304 for coupling itself to the disk drives 14a to 14d, as well as network couple ion circuits 303a and 303b for coupling itself to network switches 12a and 12b.

Those devices are coupled to the processor 301 through a processor bus 305, which is a fast signal bus.

In the embodiment shown in FIG. 3, it is expected that the processor 301 executes the control program stored in the local memory 302 to execute the functions of the disk adapters. Similarly to the input/output channels, some or all the functions of the control program can be implemented as a hardware item.

Figure 4:
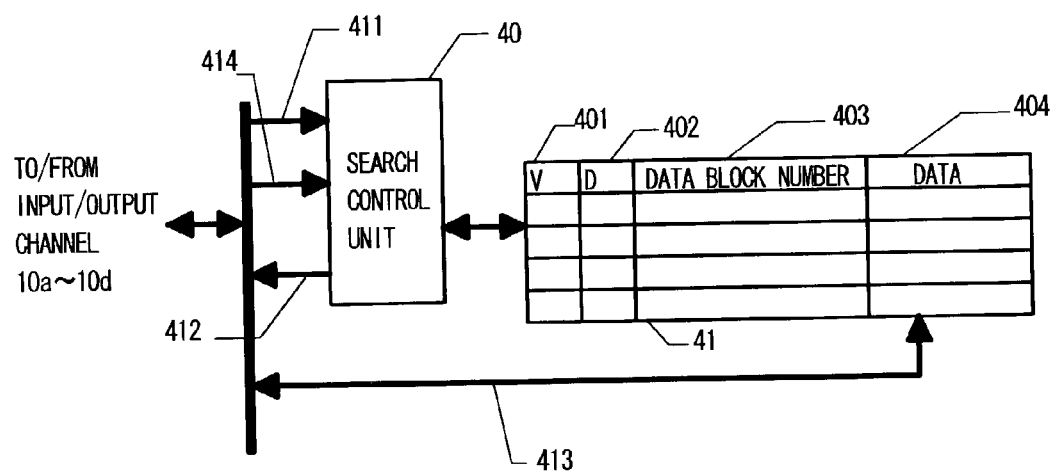
FIG. 4 is an embodiment of a cache memory used for the disk array system of the invention.

FIG. 4 is a block diagram of each of cache memories 11a to 11d usable in the embodiment of the invention shown in FIG. 1.

The cache memory shown in FIG. 4 is small in capacity. The cache memory is composed of a search control unit 40 and a memory 41. The memory 41 stores various data items in the fields of valid bit V 401, rewrite bit D 402, data block number 403, and data 404.

The input/output channels 10a notifies the search control unit 40 of a data block number of the data requested by the host computer through an address bus 411 and instructs the search control unit 40 to check the memory 41 for the presence of the data having both of the requested data block number 403 and the valid bit V set at '1' (valid).

When the requested data is found in the memory 41, the search control unit 40 sends a hit signal to the input/output channel 10a through a response signal bus 412 to notify the data existence.

The input/output channel 10a reads the data 404 through the data bus 413.

When the request is a write one, the input/output channel 10a notifies the search control unit 40 of the write command through the control command bus 414 and writes the data transferred through the data bus 413 in the data field 404, thereby the dirty bit D 402 is set (ex., at '1'). Thus, the updating is recorded.

When the requested data is not found, the search control unit 40 sends a miss signal to the input/output channel 10a through the response signal bus 412. The signal denotes the data is not present.

When any of the disk adapters 13a to 13d sends an invalidate command, the input/output channels 10a notifies the search control unit 40 of the data block number through the address bus 411 and instructs the search control unit 40 to check the memory 41 for the presence of the data having both of the matching data block number 403 and the valid bit V 401 set at '1' (valid).

When the data is found, the input/output channel 10a also checks the state of the dirty bit D 402 for set or not set.

When the dirty bit D 402 is set, the search control unit 40 sends a dirty hit signal to the input/output channel 10a through the response signal bus 412.

Receiving the dirty hit signal, the input/output channels 10a reads the data 404 through the data bus 413 and sends back the data to the one of the disk adapters 13a to 13d that has sent the invalidate signal.

When the dirty bit D 402 is not set, the search control unit 40 sends a clean hit signal to the input/output channel 10a through the response signal bus 412.

In those two cases, any of the input/output channels 10a to 10d notifies the search control unit 40 of the data block number through the address bus 411 and the invalidate command through the control command bus 414 again, then resets the valid bit V 401 (ex., to '0') to invalidate the data set.

When the search fails, the search control unit 40 sends a miss signal to the input/output channels 10a through the response signal bus 412 to notify the search failure. In any of the above cases, the input/output channels 10a finally returns an invalidation complete signal to the one of the disk adapter 13a to 13d that has sent the invalidate command to notify the completion of the invalidation.

When the dirty bit D 402 is set and updating of the data read from a disk drive is recorded, besides as described above, the updated data is sent to the disk adapters 13a to 13d when a preset time is up or when the cache memory becomes full as described with reference to FIG. 1, then the data is written back to the necessary disk drives, thereby the dirty bit D 402 is reset (ex., '0') to delete the record of the update.

In FIG. 4, while the search control unit 40 actually controls searching in the memory 41, the searching can also be done by the processor 201 of the input/output channels 10a to 10d, which is provided only with the memory 41 and not provided with the search control unit specially.

Furthermore, while the address bus 411, the response signal bus 412, the data bus 413, and the control command bus 414 are coupled integrally to each of the input/output channels 10a to 10d in FIG. 4, the cache memory can also provided only with a single signal bus, which is used to send commands equivalent to those transferred through the address bus 411, the response signal bus 412, the data bus 413, and the control command bus 414.

In the example shown in FIG. 4, it is required that the single memory 41 stores every set of data written in the fields of valid bit V 401, rewrite bit D 402, data block number 403, and data 404. Thus, data comes to be searched in the whole memory 41.

Consequently, when the memory 41 is expanded in capacity, it is expected that searching takes much time. To avoid the problem, the example shown in FIG. 5 comes to be focused on.

Figure 5:
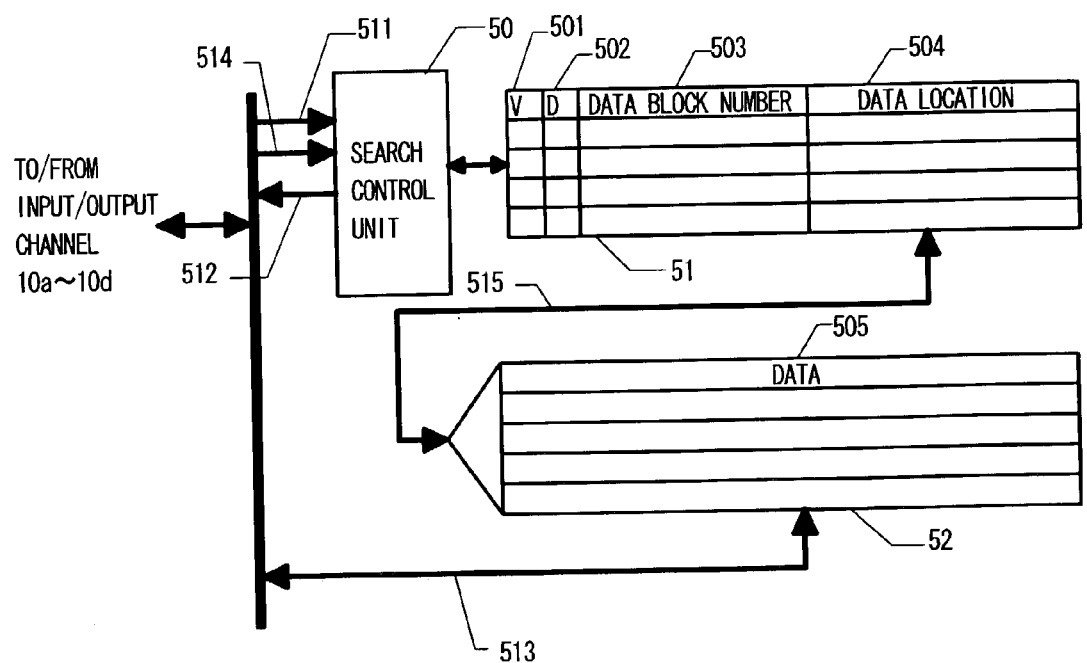
FIG. 5 is another embodiment of the cache memory used for the disk array system of the invention.

FIG. 5 is another block diagram of each of the cache memories 11a to 11d usable in the embodiment of the invention shown in FIG. 1.

In FIG. 5, the cache memory is configured by a search control unit 50, a tag part 51, and a data part 52. The tag part 51 stores each set of data written in the fields of valid bit V 501, dirty bit D 502, data block number 503, and data location 504.

The data part 52 stores the data written in the field 505.

The fields of valid bit V 501, dirty bit D 502, and data block number 503 in the tag part 51 are identical to those in the example shown in FIG. 4.

The data location field 504 stores a location of each data item written in the data part field 52.

When data is to be read from the data part 52, a data location signal 515 notifies the data part 52 of the data location within the data part 502 according to the data location 504 corresponding to the data block number 503, thereby the data is read onto the data bus 513.

Similarly to the read operation described above, write data transferred through the data bus 513 is written in the location specified by the data location signal 515.

Signals to be transferred through the address bus 511, the control command bus 514, and the response signal bus 512 are identical to those in the example shown in FIG. 4.

With the configuration, the cache memory shown in FIG. 5 can search target data only in the tag part 51. This is why the searching time is not affected so much by the capacity of the data part 52.

In other words, in the example shown in FIG. 4, when the number of data blocks increases, more semiconductor chips are required, so that data comes to be searched in those semiconductor chips, resulting in an increase of the searching time. This is because the memory 41 also stores the data written in the data part 52. On the other hand, in the example shown in FIG. 5, the semiconductor chip that stores data written in the data part is provided separately from the semiconductor chip that stores data written in the tag part. Consequently, the number of semiconductor chips for storing the tag part can be reduced, thereby data is searched in the reduced number of chips. The searching time thus becomes short.

While the search control unit 50 actually controls searching in the tag part 51 in FIG. 5, the cache memories 11a to 11d can also be searched by the processor 201 in each of the input/output channels 10a to 10d. In this case, each of the cache memories 11a to 11d is provided only with the tag part 51 and the data part 52 and not provided with the search control unit specially.

Furthermore, while the address bus 511, the response signal bus 512, the data bus 513, and the command bus 514 are integrally coupled to each of the input/output channels 10a to 10d in FIG. 5, each of the cache memories 11a to 11d can also be provided only with a single signal bus just like the example shown in FIG. 4 and commands equivalent to the signals that pass in the above buses 511, 512, 513, and 514 are transmitted in the single bus.

FIG. 6 is a format of a data table provided in each of the input/output channels 10a to 10d. The table stores data block numbers and disk adapter numbers used to identify which of the disk adapters 13a to 13d should be requested for object data when data requested from the host computer is not found in the coupled cache memories 11a to 11d.

In the data table, a data block number and a disk adapter number are paired and the data block numbers are set according to the amount predetermined between the host computer and each of the input/output channels 10a to 10d.

Any number of consecutive data block numbers (ex., 16) to be stored in the disk drives coupled to the same disk adapter can be grouped so as to create pairs of the start disk drive number and a disk adapter number.

As a result, the data table can be reduced only to, for example, 1/16 in size.

Such a data table is stored, for example, in the local memory 202 shown in FIG. 2 and the data in the table is read/written by the processor 201 as needed.

FIG. 7 is a format of another data table used to store data denoting a location of each data item requested from each input/output channel 10a to 10d. The data table is provided in each of the disk adapters 13a to 13d.

Each of the data tables stores data sets, each being configured by a data block number, a disk drive number, a data location, and an input/output channel number that denotes a destination input/output channel.

When data of the data block number has not been sent to any input/output channel before, the input/output channel number field is stored as a predetermined invalid input/output channel number.

When the cache memory of an input/output channel becomes full, thereby the sent data is rejected/deleted from the cache memory, the input/output channel number field can be set as an invalid input/output channel number.

The size of these data tables can be determined by the amount of data block numbers stored in any of the subject disk drives 14a to 14d coupled to each of the disk adapters 13a to 13d.

These data tables are actually stored in the local memory 302 shown, for example, in FIG. 3 and data in the tables is read/written by the processor 301 as needed.

FIG. 8 is a format of the invalidate command. This command is sent from the disk adapters 13a to 13d to the input/output channels 10a to 10d so as to invalidate some data sent to the cache memory of the input/output channels 10a to 10d when the sent data is requested again from another input/output channel.

The format is composed of an invalidate command code that represents an invalidate command and a data block number of the data to be invalidated.

In addition to the above method for invalidating the data sent to the cache memory of one of the input/output channels 10a to 10d with an invalidate command when the sent data is requested again from another input/output channel as described above, there is also another method used by any of the disk adapters 13a to 13d to implement the same function without doing the invalidation. Concretely, when some same data is updated among plural input/output channels, the system writes back the updated data to the necessary disk drives through the disk adapters 13a to 13d and updates the data in the cache memories of all of other input/output channels instead of the invalidation.

FIG. 9 is a format of the update command to be sent to the input/output channels 10a to 10d from the disk adapters 13a to 13d instead of the invalidate command shown in FIG. 8 in such a case.

The update command is composed of a command code that denotes the update command, a subject data block number, and update data used to update the subject data.

How to control the cache memories 11a to 11d in response to the update command shown in FIG. 9 will be described in detail later.

Figure 10:
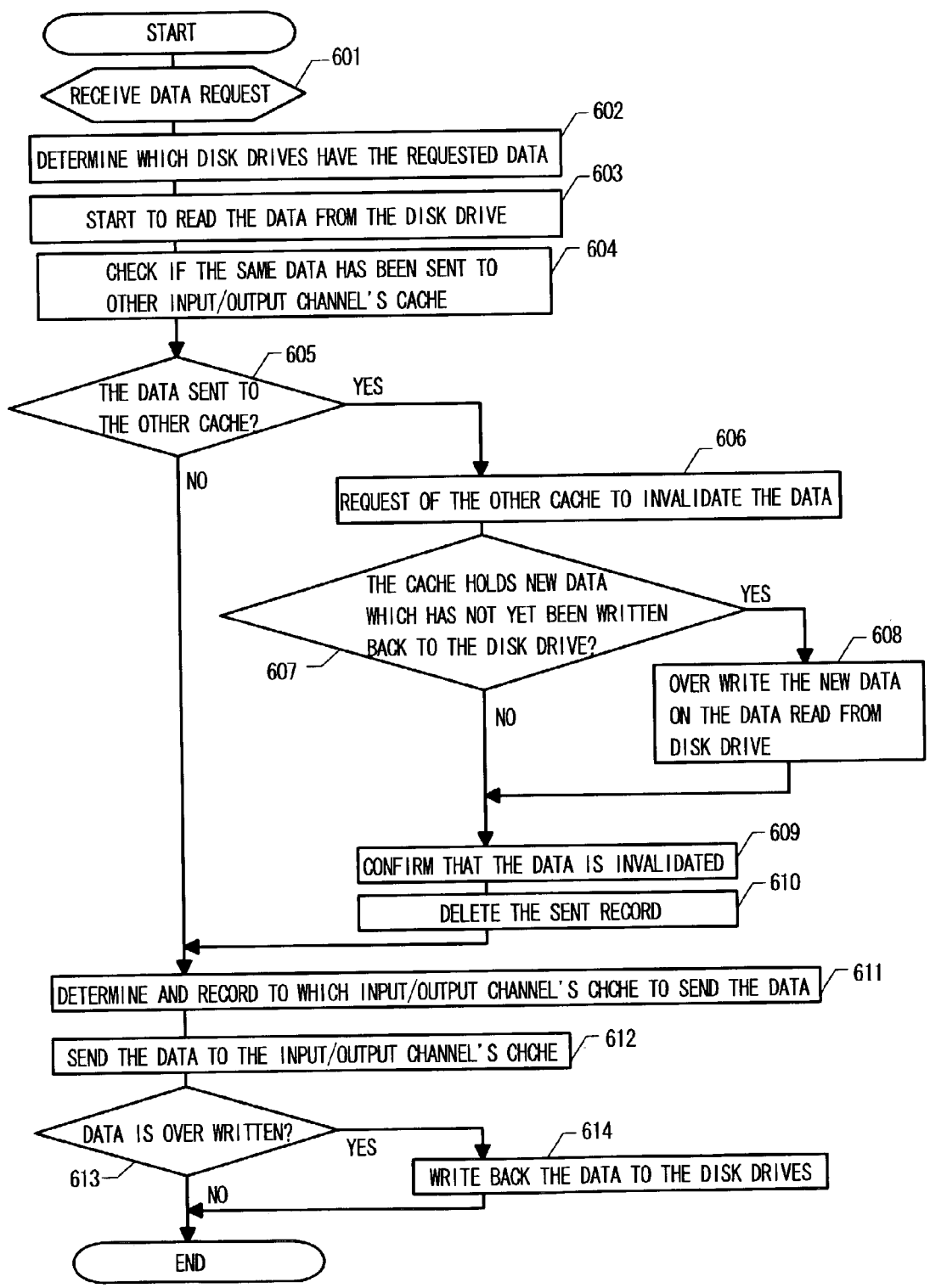
FIG. 10 is a first embodiment of a method of controlling a cache memory in the disk array system of the invention.

FIG. 10 is a flowchart for controlling each of the cache memories 11a to 11d in response to the invalidate command shown in FIG. 8.

In FIG. 10, it is assumed that data requested from the host computer is not found in the cache memory.

When the requested data is found in the cache memory as a result of searching in response to a read request, the system is just required to read the data from the cache memory and send the data to the host computer as described in the example of the cache memory shown in FIGS. 4 and 5. When data is to be written, the system is just required to update the data in the cache memory with the write data received from the host computer.

In FIG. 10, a data request is received in step 601 and the requested data is not found in the cache memory of the subject input/output channel.

In step 602, the system determines a disk drive that stores requested data.

In detail, the input/output channel determines a disk adapter coupled to the disk drive that stores the requested data with reference to the data table as shown in FIG. 6, then sends the data request to the disk adapter.

The disk adapter, upon receiving the data request, determines the target disk drive and the target data location in the drive with reference to the data table as shown in FIG. 7.

In step 603, the disk adaptor starts to read the data from the disk drive according to the result determined in step 602.

Actually, the disk adaptor need to complete the reading of the data from the disk drive only before step 608 or 612 as will be described later. There is no need for the disk adaptor to wait until the data reading is completed in step 602.

In step 604, the disk adaptor checks if the same data has been sent to the cache memory of other input/output channel before.

In detail, the disk adaptor checks if any valid input/output channel number is registered as a destination input/output channel number in the data table as shown in FIG. 7.

In step 605, the disk adaptor determines if the requested data has been sent to the cache memory of other input/output channels before.

When the determination result is NO (not sent), the system goes to step 611.

When the determination result is YES, the system sends an invalidate command as shown in FIG. 8 to the input/output channel in step 606 to delete the data from the cache memory of the input/output channel.

At this time, the system determines in step 607 if the data has been modified in the cache memory of the input/output channel and the modified data has not yet been written back to the disk drive.

In detail, the system makes this determination by checking the dirty bit D 402 or 502 shown in FIG. 4 or 5.

When the determination result is NO (not written back), the system reads the modified data from the input/output channels cache memory and returns the data to the disk adapter in step 608.

The disk adapter waits for completion of reading of the data from the disk drive, which has started in step 603, then overwrites the modified data returned from the input/output channel on the data read from the disk drive.

In step 609, the disk adaptor waits for an invalidation complete signal to be received from the input/output channel to confirm the completion of the invalidation.

In step 610, the disk adaptor sets a predetermined invalid channel number as described in FIG. 7 as the destination input/output channel number to delete the destination record from the data table shown in FIG. 7.

After this, the input/output channel number that is to send another data in step 611 (to be described later) is recorded as this destination input/output channel number. This step can thus be omitted.

In step 611, the disk adaptor determines to send data to the cache memory of the input/output channel, which is determined as a new request source in step 601, then records the input/output channel number.

In detail, the system records a valid channel number as the destination input/output channel number in the data table as shown in FIG. 7.

If the reading that has started in step 603 is not completed yet at this time, the system waits for completion of reading from the disk drive in step 612. The system then sends the read data to the input/output channel so that the data is returned to the host computer and stored in the cache memory coupled to the input/output channel.

In step 613, the system determines if any data is overwritten on the data read from the disk drive after the processing in step 608.

When some data is overwritten, the system goes to step 614 to write back the overwritten data to the disk drive.

In the embodiment of the controlling method present invention, employed for the cache memory shown in FIG. 10, it is possible to complete reading from the disk drive, which begins in step 603 in or before step 608 or 612, to overlap the processing with the invalidation of the cache memory of another input input/output channel that has read the data, thereby eliminating the overhead to occur with respect to the invalidation of cache memory.

Figure 11:
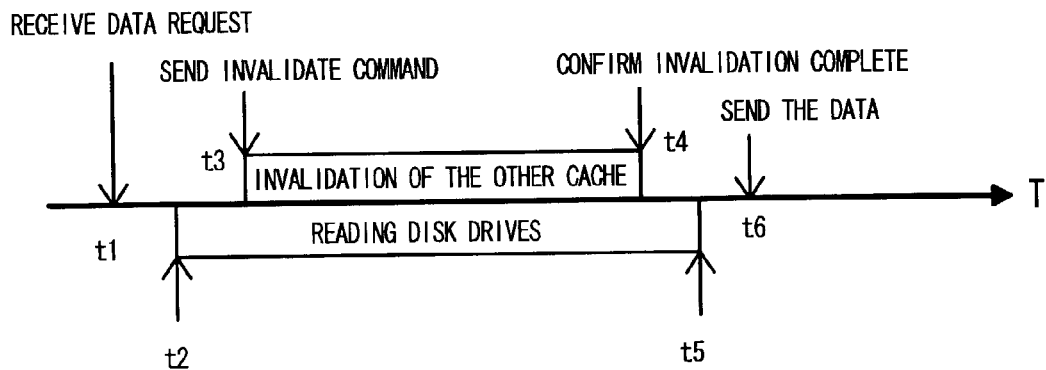
FIG. 11 is an example of timing chart of the operation of the cache memory in the embodiment shown in FIG. 10.

FIG. 11 is a timing chart that denotes the elimination of the overhead.

In FIG. 11, time t1 corresponds to step 601 shown in FIG. 10, in which the system receives a data request at the time t1.

After the processing in step 602, the system goes to step 603 shown in FIG. 10 at time t2 to start data reading from the disk drive.

After this, the system executes the processing in steps 604 and 605, then goes to step 606 at time t3 to issue an invalidate command to the input/output channel.

FIG. 11 shows a case in which it is found in an invalidation processing that there is no data that has not yet been written back.

In FIG. 11, the system goes to step 609 at time t4 after completing the processing in step 607, then confirms the completion of the invalidation in the same step (609).

The system then executes the processing in steps 610 and 611 and completes the reading from the target disk drive at time t5.

After this, the system goes to step 612 at time t6 to send the data to the target input/output channel.

After the processing in step 613, the processing in this flowchart is ended.

As shown in FIG. 11, reading from a disk drive between t2 (step 603) and time t5 overlaps with the invalidation between t3 (step 606) and time t4 (step 609), so that no overhead occurs in the invalidation.

Figure 12:
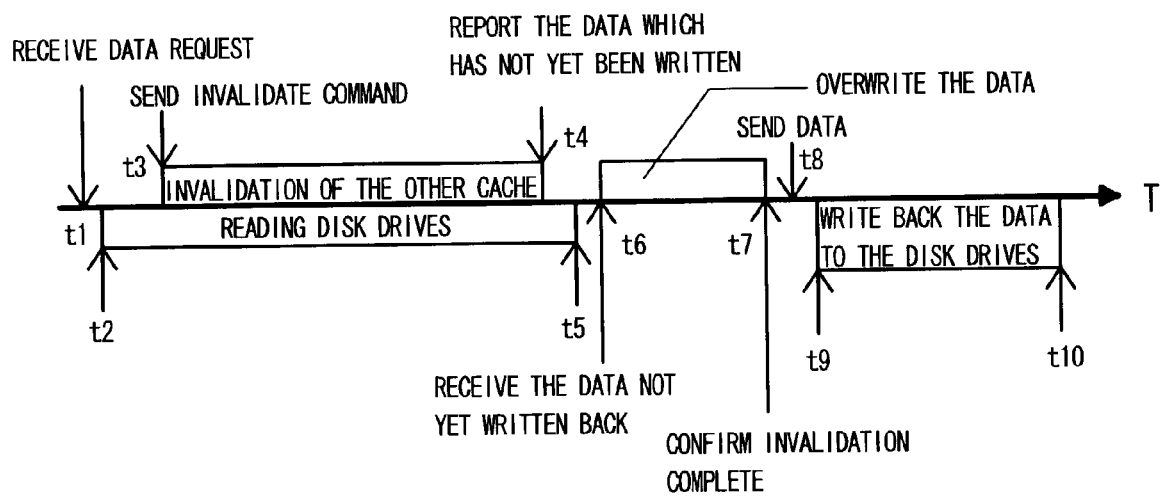
FIG. 12 is another example of timing chart of the operation of the cache memory shown in the embodiment shown in FIG. 10.

FIG. 12 is a timing chart for invalidation processing in which there is some data that has not yet been written back to any disk drive in the cache memory to be invalidated.

In FIG. 12, time t1 corresponds to step 601 shown in FIG. 10. At time t1, the system receives a data request.

After the processing in step 602, the system goes to step 603 shown in FIG. 10 at time t2 and starts to read data from the target disk drive.

After this, the system executes the processing in steps 604 and 605, then goes to step 606 at time t3 to issue an invalidate command to the target input/output channel.

In FIG. 12, it is assumed here that some data that has not written back to the disk drive is found in an input/output channel during the invalidation.

The system then goes to step 607 at time t4 to report the presence of not-yet-written-back data to the disk adapter through the input/output channel.

Consequently, the system, after completing the reading of data from the disk drive at time t5, goes to step 608 at time t6 and instructs the input/output channel to send the not-written-back data so as to overwrite the data on the data read from the disk drive in the disk adapter.

The system then completes both sending of the not-written-data through this input/output channel and overwriting of the data on the data read from the disk drive at time t7, then goes to step 609 to confirm the completion of the invalidation in the same step (609).

The system then executes the processing in steps 610 and 611 and goes to step 612 at time t8 to send the data to the target input/output channel.

Then, the system executes the processing in step 613 and step 614 at time t9 to write back the overwritten data to the necessary disk drives.

This writing-back is completed at time t10.

In FIG. 12, some overhead occurs due to the overwriting between time t6 (step 608) and time t7 (step 609) and the writing back to the disk drives between time t9 (step 614) and time t10.

The overhead occurrence frequency in this processing seems to be low, since the occurrence is limited only upon a data request issued from a host computer coupled to another input/output channel while the object data is stored in the cache memory of an input/output channel and the data has not yet written back to the disk drives after the data is modified by a host computer.

In the embodiment of the cache memory control method of the invention shown in FIG. 10, reading from a disk drive and invalidation of another cache memory overlap as shown in FIGS. 11 and 12. On the other hand, there is a more simple method, which invalidates another cache memory first. Then, if there is any data that is not written back to the disk drive in the cache memory to be invalidated, the data in the cache memory is written back to the necessary disk drives, then the data is read from any of the disk drives. This can not utilize the overlapping to occur between invalidation of another cache memory and reading from the disk drive, but the controlling becomes simple.

There is also another method that when overlapping of invalidation of another cache memory with reading from a disk drive can not be utilized while there is any data that is not written back to the disk drive in the cache memory to be invalidated, the data is written back to the disk drives, then the written-back data is not read from the disk drives. Instead, the written-back data is used as it is. Consequently, the system can reduce the time of reading from a disk drive though it can not utilize the overlapping invalidation of another cache memory with reading from the disk drive.

As described above, FIG. 10 shows an example in which the system, when receiving a request for the same data from another input/output channel after having sent the data to an input/output channel, invalidates the data sent to the cache memory of the former input/output channel.

On the other hand, some applications that run in a host computer often cope with the occurrence of an overhead during a write operation more easily than the occurrence of an overhead during a read operation.

Figure 13:
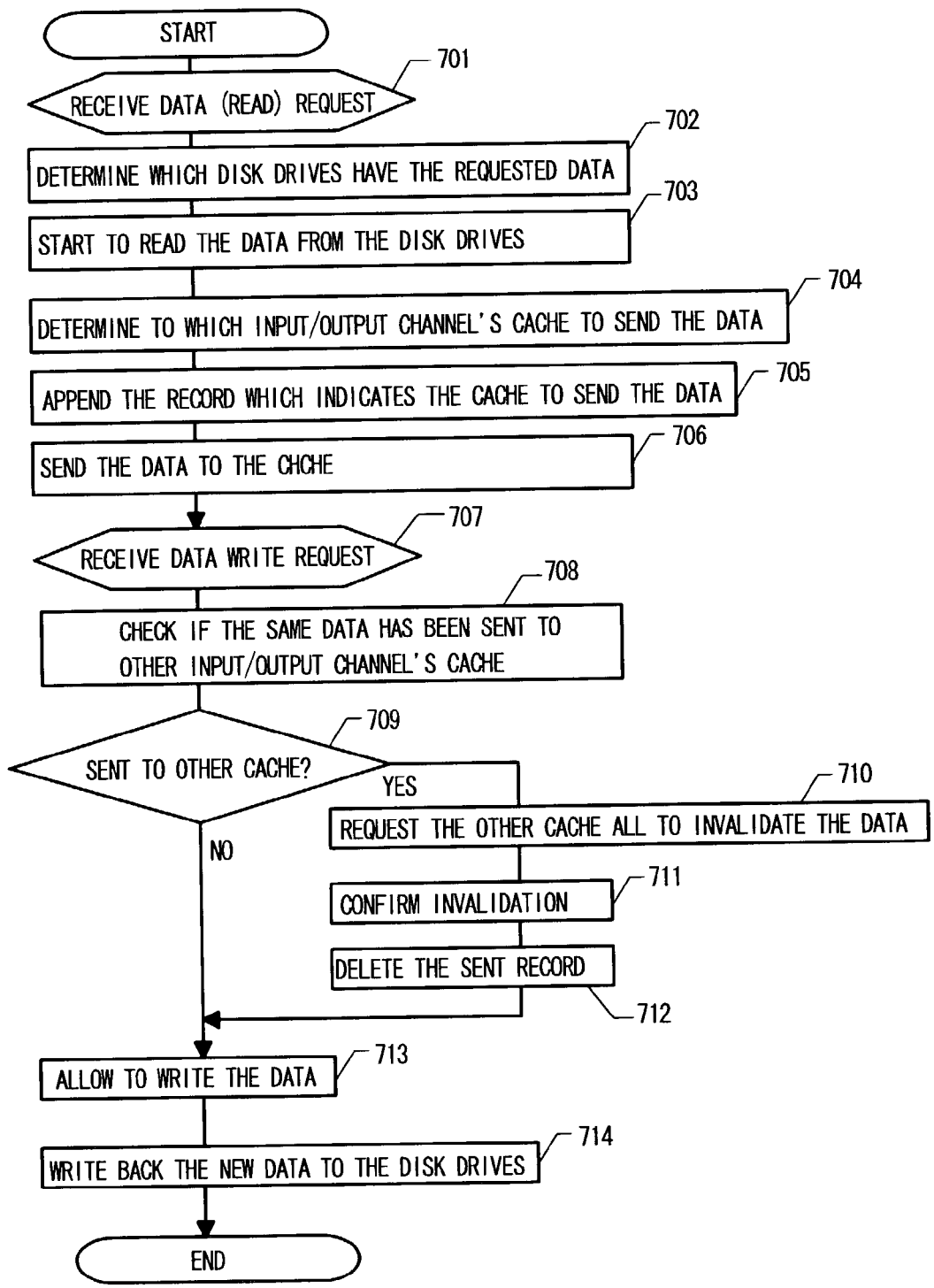
FIG. 13 is a second embodiment of method of controlling a cache memory in the disk array system of the invention.

FIG. 13 is a flowchart for controlling the cache memory of the invention with respect to such a case.

In FIG. 13, the system receives a data request in step 701. In this example, it is assumed that the requested data is not found in the cache memory of the input/output channel just like the example shown in FIG. 10.

In step 702, the system determines which disk drive stores the requested data.

In step 703, the system begins to read the data from the disk drive according to the determination in step 702.

The system is just expected to complete the reading the data from the disk drive in or before the step 706.

Next, in step 704, the system determines to send the data to the cache memory of the input/output channel that is the determined as the request source in step 701, then adds this input/output channel to the record of the destination input/output channels in step 705.

In this embodiment, one data item can come to be sent to plural input/output channels.

In detail, this record is written in the input/output channel number field in the data table as shown in FIG. 7. In the embodiment shown in FIG. 13, it is required that all the numbers of the input/output channels provided for the disk array system need to be recorded in this input/output channel number field with respect to one data block number set.

When the reading from the disk drive, started in step 703, is not completed at this time, the system waits for the completion, then sends the read data to the target input/output channel so that the data is returned to the host computer and stored in the cache memory coupled to the input/output channel in step 706.

It is also assumed here that the input/output channel has received a new write request from the host computer in step 707.

In this embodiment, the input/output channel does not write the data in the cache memory immediately, but notifies the disk adapter of the received write request.

The disk adapter checks in step 708 if there are cache memories of any other input/output channels, which have received the same data.

When the check result is NO in step 709, the system goes to step 713.

When the check result is YES, the system goes to step 710 to issue an invalidation request to the cache memories of all those input/output channels, which have received the same data.

The invalidate command shown, for example, in FIG. 8 can be used as this invalidation request.

After confirming the invalidation in step 711, the system deletes the invalidated cache memory's input/output channel number from the record of the input/output channel numbers in step 712.

In step 713, the system permits writing for the input/output channel that has received the write request, so that the input/output channel receives write data from the host computer and writes the data in its cache memory.

The system then sends the data written in the cache memory to the disk adapter from the input/output channel in step 714 and instructs the disk adapter to write back the data to the necessary disk drives.

Consequently, inconsistency of modifying the same data by another input/output channel after that can be avoided.

In the example shown in FIG. 13, while the first data request processing is more simplified than that in the example shown in FIG. 10, overhead occurs when in writing, since the cache memories of other input/output channels will be invalidated.

Furthermore, when in writing, it is required that data is written in the cache memory of the input/output channel, as well as the written data is transferred to the target disk adapter from the input/output channel, then written back to the necessary disk drives.

Furthermore, because the cache memories are invalidated as such, when the same data is requested from another input/output channel at this time, the data must be read again from the disk drive through the disk adapter.

Figure 14:
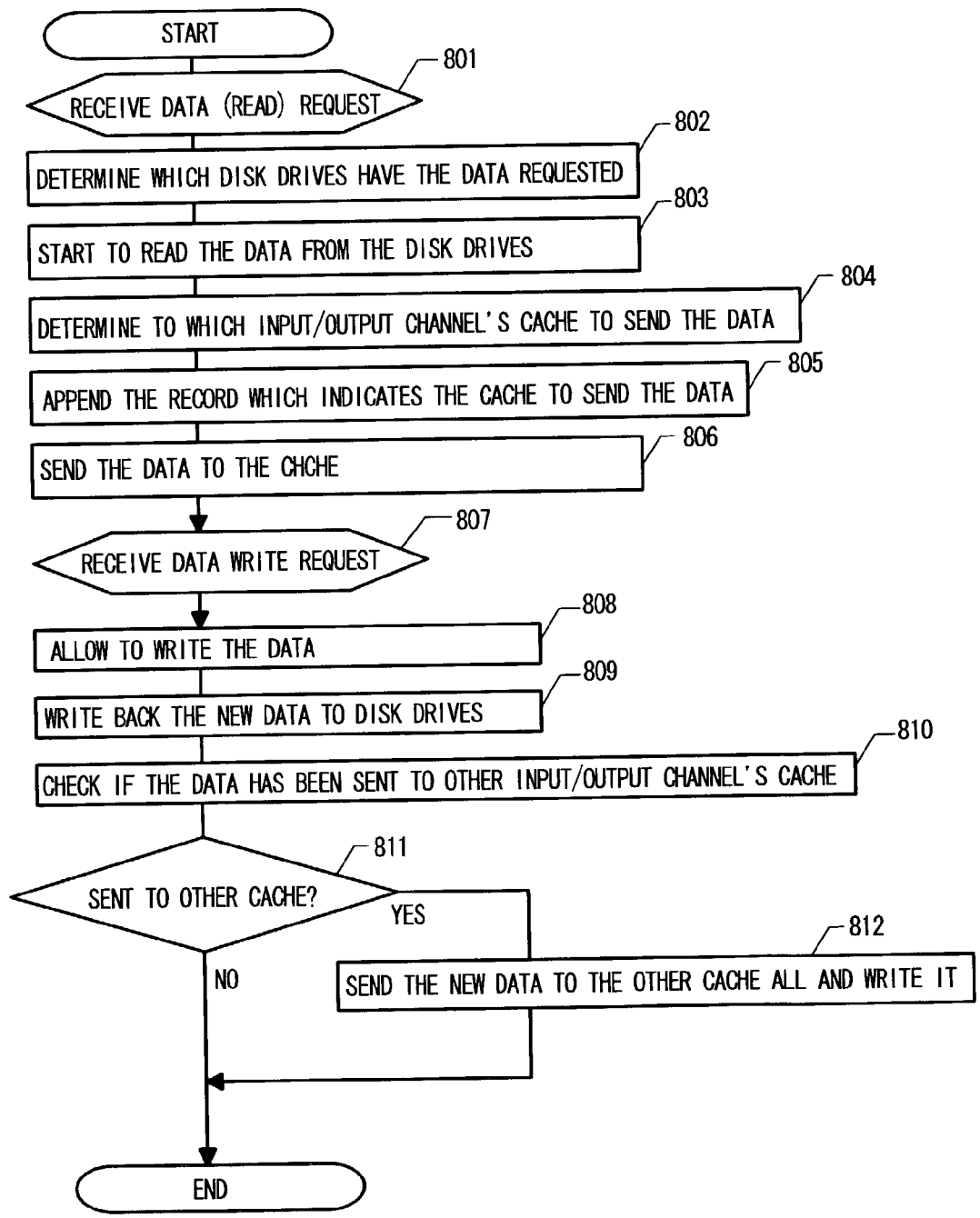
FIG. 14 is a third embodiment of method of controlling a cache memory in the disk array system of the invention.

This last problem can be avoided, however, by employing the following example as shown in FIG. 14.

FIG. 14 is a flowchart for controlling the cache memory of another embodiment of the invention.

In FIG. 14, the processing in steps 801 to 806 are identical to those in steps 701 to 706 shown in FIG. 13.

In other words, the system receives a data request in step 801. Also in this case, it is assumed that the requested data is not found in the cache memory of the input/output channel, as in the examples in FIGS. 10 and 13.

In step 802, the system determines a disk drive that stores the requested data.

In step 803, the system begins to read the data from the disk drive according to the determination in step 802.

In this embodiment, the system is just expected to complete the reading of the data from the disk drive in or before step 806.

In step 804, the system determines to send the data to the cache memory of the input/output channel that is the request source in step 801. The system then adds this input/output channel to the record of the destination input/output channels in step 805.

In this embodiment, just like the example shown in FIG. 13, one data item can come to correspond to plural destination input/output channels.

If the reading from the disk drive, started in step 803, is not completed yet at this time, the system waits for the completion in step 806, then sends the read data to the input/output channel so that the data is returned to the host computer and stored in the cache memory coupled to the input/output channel.

In step 807, it is also assumed that the input/output channel has received a write request from the host computer.

In FIG. 14, the system permits writing to the cache of the input/output channel in step 808, so that the data received from the host computer is written in the cache memory.

In step 809, the system instructs the input/output channel to transfer the data to the disk adapter and writes the data back to the original data stored disk drive.

Next, the disk adapter checks if the same data has been sent to any other input/output channels cache memory in step 810.

When the check result is YES in step 811, the system goes to step 812.

In step 812, the system instructs the disk adapter to send the data written in the disk drive to all of other input/output channels cache memories that store the old data so as to update the data.

The update command as shown in FIG. 9 can be used for this data updating.

Consequently, inconsistency can be avoided just like in the example shown in FIG. 13 even when another input/output channel updates the data hereafter.

Even in the example shown in FIG. 14, the first data request processing is simplified more than that in FIG. 10. When in writing, however, some overhead occurs in the processing due to the updating of the cache memories of other input/output channels.

Furthermore, when in write processing, the data must also be written in the cache memory of the input/output channel and transferred from the input/output channel to the disk adapter, then written back to the necessary disk drives.

However, because the data in the cache memories of other input/output channels is updated with the written data in the write operation, the data is just read from one of those cache memories upon receiving a request to the same data from another input/output channel even after some write operations.

According to the invention, plural cache memories are distributed among input/output channels and there is no need to couple input/output channels and disk adapters to a single cache memory where the concentrated couple ion has been required conventionally. Consequently, the invention makes it effective to configure a large scale disk array system by increasing the number of input/output channels and the number of disk adapters.

Furthermore, each network switch used to couple an input/output channel to a disk adapter is just required to have a delay time shorter than the disk drive reading time in the disk adapter. The disk array system can thus configure a multi-step network easily and the scale can further be expanded effectively.

Furthermore, because a cache memory is coupled directly to each input/output channel, the performance of the system including the number of input/output operations per second can be improved significantly when the data is stored in the cache memory.

And, because each input/output channel is coupled directly to a disk adapter through network switches, even when data is to be read from a disk drive, the reading path is short and the data can be transferred fast.

The foregoing invention has been described in terms of preferred embodiments. However, those skilled, in the art will recognize that many variations of such embodiments exist. Such variations are intended to be within the scope of the present invention and the appended claims.

What is claimed is:

1. A disk array system, comprising:
   a plurality of input/output channels for communicating with a host computer;
   a plurality of cache memories each coupled to said plurality of input/output channels exclusively and for storing input/output data temporarily;
   one or more disk drives;
   one or more disk adapters coupled to said one or more disk drives; and
   one or more networks for coupling said plurality of input/output channels to said one or more disk adapters, wherein
   each of said plurality of cache memories is directly connected to a corresponding one of said plurality of input/output channels on a one-to-one correspondence and exclusively controlled by said corresponding one of said plurality of input/output channels, wherein,
   when said system is provided with a plurality of said disk adapters, each of said plurality of input/output channels includes a destination disk adapter determining measure that determines which of said plurality of disk adapters couples said one or more disk drives which stores requested data upon receiving a data request from said host computer.

2. A disk array system, comprising:

a plurality of input/output channels for communicating with a host computer;

a plurality of cache memories each coupled to said plurality of input/output channels exclusively and for storing input/output data temporarily;

one or more disk drives;

one or more disk adapters coupled to said one or more disk drives; and one or more networks for coupling said plurality of input/output channels to said one or more disk adapters, wherein each of said plurality of cache memories is directly connected to a corresponding one of said plurality of input/output channels on a one-to-one correspondence and exclusively controlled by said corresponding one of said plurality of input/output channels, wherein each of said one or more disk adapters is provided with a destination channel recording measure that records information denoting which of said plurality of input/output channels couples a corresponding one of said cache memories that stores the data read from said one or more disk drives coupled to itself.

3. The disk array system according to claim 2,

Wherein each of said one or more disk adapters includes a cache memory invalidating measure that sends invalidate command to a corresponding one of said plurality of cache memories according to the data recorded in said destination channel recording measure so as to invalidate the data read from said one or more disk drives provided in said corresponding one of said plurality of cache memories.

4. The disk array system according to claim 2,

Wherein each of said one or more disk adapters includes a cache updating measure that finds a corresponding one of said plurality of cache memories that stores original data to be updated when the data stored in said one or more disk drives is updated according to the data recorded in said destination channel recording measure and updates said original data stored in said corresponding one of said plurality of cache memories with said updated data.

5. A cache memory control method employed for a disk array system comprising:

a plurality of input/output channels used for communications with a host computer;

a plurality of cache memory coupled to each of said plurality of input/output channels and used to store input/output data temporarily;

one or more disk drives;

one or more disk adapters coupled to said one or more disk drives; and one or more networks used to couple said plurality of input/output channels to said one or more disk adapters, wherein each of said plurality of input/output channels, upon receiving a data request from said host computer and then not finding said requested data in its coupled cache memory, transfers said data request to said disk adapter which is coupled to disk drives which store said requested data; and wherein said disk adapter, upon receiving said data request, processes the steps of:

determining which disk drive stores said requested data;

checking if said requested data has been requested from another input/output channel before;

beginning to read said data from said determined disk drives when the check result is NO;

determining a cache memory to which said read data is to be sent in response to said data request;

recording said determined cache memory in response to said data request;

sending said data read from said disk drive to said cache memory in response to said data request;

identifying a cache memory to which said data has been sent before in response to said preceding data request when said check result is YES;

sending a request to said identified cache memory so as to invalidate said data stored therein;

writing back said data to a disk drive when said data to be invalidated in said identified cache memory includes any data that is not written back to said disk drive after modified within said identified cache memory;

confirming completion of said invalidation;

beginning to read said data from said determined disk drive;

determining a cache memory to which said read data is to be sent in response to said data request;

recording said determined cache memory; and sending said data read from said disk drive to said determined cache memory in response to said data request.

6. A cache memory control method employed for a disk array system comprising:

a plurality of input/output channels used for communications with a host computer;

a plurality of cache memory coupled to each of said plurality of input/output channels and used to store input/output data temporarily;

one or more disk drives;

one or more disk adapters coupled to said one or more disk drives; and one or more networks used to couple said plurality of input/output channels to said one or more disk adapters, wherein each of said plurality of input/output channels, upon receiving a data request from a host computer and not finding said requested data in its coupled cache memory, transfers said data request to said disk adapter which is coupled to disk drives which store requested data; and wherein said disk adapter, upon receiving said data request, processes the steps of:

determining which disk drive stores said requested data;

beginning to read said requested data from said determined disk drive;

checking in response to said data request if said requested data has been requested from another input/output channel before;

determining a cache memory in response to said data request to which said read data is to be sent when said check result is NO;

recording said determined cache memory in response to said data request;

sending said data read from said disk drive to said cache memory in response to said data request;

identifying, on the basis of contents recorded before, a cache memory to which said data has been sent in response to said preceding data request when said check result is YES;

sending a request to said identified cache memory so as to invalidate said data stored therein;

overwriting said data stored in said identified cache memory on said data read from said disk drive in response to said data request when said data to be invalidated in said identified cache memory includes some data that is not written back to said disk drive after modified within said identified cache memory;

confirming completion of said invalidation;

determining a cache memory to which said data read from said disk drive or said overwritten data when said overwriting is done is to be sent in response to said data request;

recording said determined cache memory;

sending said data read from said disk drive or said overwritten data when said overwriting is done to said determined cache memory in response to said data request; and writing back said overwritten data to said disk drive when said overwriting is done.

7. A cache memory control method employed for a disk array system comprising:

a plurality of input/output channels used for communications with a host computer;

a plurality of cache memory coupled to each of said plurality of input/output channels and used to store input/output data temporarily;

one or more disk drives;

one or more disk adapters coupled to said one or more disk drives; and one or more networks used to couple said plurality of input/output channels to said one or more disk adapters, wherein each of said plurality of input/output channels, upon receiving a data request from a host computer and then not finding said requested data in its coupled cache memory, transfers said data request to said disk adapter which is coupled to disk drives which store requested data; and wherein said disk adapter, upon receiving said data request, processes the steps of:

determining which disk drive stores said requested data;

checking if said requested data has been requested from another input/output channel before;

beginning to read said data from said determined disk drive when the check result is NO;

determining a cache memory to which said read data is to be sent in response to said data request;

recording said determined cache memory in response to said data request;

sending said data read from said disk drive to said cache memory in response to said data request;

identifying a cache memory to which said data has been sent before in response to said preceding data request when said check result is YES;

sending a request to said identified cache memory so as to invalidate said data stored therein;

writing back said data to a disk drive when said data to be invalidated in said identified cache memory includes any data that is not written back to said disk drive after modified within said identified cache memory;

confirming completion of said invalidation;

beginning to read said data from said determined disk drive in response to said data request when data to be invalidated in said identified cache memory includes no data that is not written back to said disk drive and no writing back is done to said disk drive;

determining, in response to said data request, a cache memory to which said read data or said data written back to said disk drive is to be sent;

recording said determined cache memory; and sending said read data or said written-back data to said determined cache memory in response to said data request.

8. A cache memory control method employed for a disk array system comprising:

a plurality of input/output channels used for communications with a host computer;

a plurality of cache memory coupled to each of said plurality of input/output channels and used to store input/output data temporarily;

one or more disk drives;

one or more disk adapters coupled to said one or more disk drives; and one or more networks used to couple said plurality of input/output channels to said one or more disk adapters, wherein each of said plurality of input/output channels, upon receiving a write request from a host computer, transfers said write request to said disk adapter which is coupled to disk drives which store requested data without writing any data; and wherein said disk adapter processes the steps of:

checking if said data requested to be written has been requested from other input/output channels before;

permitting said input/output channel to write said write data in a cache memory when the check result is NO;

writing said requested write data in a disk drive;

identifying cache memories to which said data requested to be written has been sent before in response to said preceding data request according to the record that records to which cache memories said requested data has been sent when said check result is YES;

sending a request to said identified cache memories so as to invalidate said data stored therein;

confirming completion of said invalidation;

deleting said invalidated cache memories from the record that records to which said requested data has been sent;

permitting said input/output channel to write said requested write data in a cache memory; and writing said requested write data in a disk drive.

9. A cache memory control method employed for a disk array system comprising:

a plurality of input/output channels used for communications with a host computer;

a plurality of cache memory coupled to each of said plurality of input/output channels and used to store input/output data temporarily;

one or more disk drives;

one or more disk adapters coupled to said one or more disk drives; and one or more networks used to couple said plurality of input/output channels to said one or more disk adapters, wherein each of said plurality of input/output channels, upon receiving a write request from a host computer, writes requested write data in a cache memory and transfers said write request to said disk adapter which is coupled to disk drives which store requested data; and wherein said disk adapter processes the steps of:

writing said requested write data in a disk drive;

checking if said data requested to be written has been requested from other input/output channels before;

terminating the processing when said check result is NO;

identifying cache memories to which said requested data has been sent before in response to said preceding request according to the record that records to which cache memories said requested data has been sent in response to said preceding data request when said check result is YES; and writing said requested write data in said identified cache memories.

10. A disk array system having cache memory control, comprising:

a plurality of input/output channels used for communications with a host computer;

a plurality of cache memory coupled to each of said plurality of input/output channels and used to store input/output data temporarily;

one or more disk drives;

one or more disk adapters coupled to said one or more disk drives; and one or more networks used to couple said plurality of input/output channels to said one or more disk adapters, wherein each of said plurality of input/output channels, upon receiving a data request from said host computer and then not finding said requested data in its coupled cache memory, transfers said data request to said disk adapter which is coupled to disk drives which store said requested data; and wherein said disk adapter includes:

means for determining, upon receiving said data request, which disk drive stores said requested data;

means for checking if said requested data has been requested from another input/output channel before;

means for reading said data from said determined disk drives in response to said checking means having a check result of NO;

means for determining a cache memory to which said read data is to be sent and for recording said determined cache memory in response to said data request;

means for sending said data read from said disk drive to said cache memory in response to said data request;

means for identifying a cache memory to which said data has been sent before in response to said checking means having a check result of YES and for sending a request to said identified cache memory so as to invalidate said data stored therein; and means for writing back said data to a disk drive when said data to be invalidated in said identified cache memory includes any data that is not written back to said disk drive after being modified within said identified cache memory, wherein said means for determining a cache memory to which said read data is to be sent and for recording said determined cache memory in response to said data request is further formed to determine a cache memory and to record said determined cache memory in response to when said data in said identified cache memory is invalidated, and said means for sending said data read from said disk drive to said cache memory in response to said data request is further formed to send said data read from said disk drive to said cache memory in response to when said data in said identified cache memory is invalidated.

11. A disk array system having cache memory control, comprising:

a plurality of input/output channels used for communications with a host computer;

a plurality of cache memory coupled to each of said plurality of input/output channels and used to store input/output data temporarily;

one or more disk drives;

one or more disk adapters coupled to said one or more disk drives; and one or more networks used to couple said plurality of input/output channels to said one or more disk adapters, wherein each of said plurality of input/output channels, upon receiving a data request from said host computer and then not finding said requested data in its coupled cache memory, transfers said data request to said disk adapter which is coupled to disk drives which store said requested data; and wherein said disk adapter includes:

means for determining, upon receiving said data request, which disk drive stores said requested data;

means for checking if said requested data has been requested from another input/output channel before;

means for reading said data from said determined disk drives;

means for determining a cache memory to which said read data is to be sent in response to said checking means having a check result of NO and for recording said determined cache memory in response to said data request;

means for sending said data read from said disk drive to said cache memory in response to said data request;

means for identifying, on the basis of contents recorded before, a cache memory to which said data has been sent in response to said checking means having a check result of YES and for sending a request to said identified cache memory so as to invalidate said data stored therein;

means for overwriting said data stored in said identified cache memory on said data read from said disk drive in response to said data request when said data to be invalidated in said identified cache memory includes data that is not written back to said disk drive after being modified within said identified cache memory, wherein said means for determining a cache memory to which said read data is to be sent and for recording said determined cache memory in response to said data request is further formed to determine a cache memory to which said read data or said overwritten data when said overwriting is done is to be sent and to record said determined cache memory in response to said data request, and said means for sending said data read from said disk drive to said cache memory in response to said data request is further formed to send said data read from said disk drive or said overwritten data when said overwriting is done to said cache memory in response to said data request.

12. A disk array system having cache memory control, comprising:

a plurality of input/output channels used for communications with a host computer;

a plurality of cache memory coupled to each of said plurality of input/output channels and used to store input/output data temporarily;

one or more disk drives;

one or more disk adapters coupled to said one or more disk drives; and one or more networks used to couple said plurality of input/output channels to said one or more disk adapters, wherein each of said plurality of input/output channels, upon receiving a data request from said host computer and then not finding said requested data in its coupled cache memory, transfers said data request to said disk adapter which is coupled to disk drives which store said requested data; and wherein said disk adapter includes:

means for determining which disk drive stores said requested data;

means for checking if said requested data has been requested from another input/output channel before;

means for reading said data from said determined disk drives in response to said checking means having a check result of NO;

means for determining a cache memory to which said read data is to be sent and for recording said determined cache memory in response to said data request;

means for sending said data read from said disk drive to said cache memory in response to said data request;

means for identifying a cache memory to which said data has been sent before in response to said checking means having a check result of YES and for sending a request to said identified cache memory so as to invalidate said data stored therein; and means for writing back said data to a disk drive when said data to be invalidated in said identified cache memory includes any data that is not written back to said disk drive after being modified within said identified cache memory, wherein said means for determining a cache memory to which said read data is to be sent and for recording said determined cache memory in response to said data request is further formed to determine, in response to said data request, a cache memory to which said read data or said data written-back to said disk drive is to be sent and to record said determined cache memory, and said means for sending said data read from said disk drive to said cache memory in response to said data request is further formed to send said data read from said disk drive or said written-back data to said determined cache memory in response to said data request.

13. A disk array system having cache memory control, comprising:

a plurality of input/output channels used for communications with a host computer;

a plurality of cache memory coupled to each of said plurality of input/output channels and used to store input/output data temporarily;

one or more disk drives;

one or more disk adapters coupled to said one or more disk drives; and one or more networks used to couple said plurality of input/output channels to said one or more disk adapters, wherein each of said plurality of input/output channels, upon receiving a write request from a host computer, transfers said write request to said disk adapter which is coupled to disk drives without writing any data; and wherein said disk adapter includes:

means for checking if said data requested to be written has been requested from other input/output channels before;

means for permitting an input/output channel to write said write data in a cache memory when the check result is NO;

means for writing said requested write data in a disk drive;

means for identifying cache memories to which said data requested to be written has been sent before in response to said preceding data request according a record that records to which cache memories said requested data has been sent when said checking means has a check result of YES and for sending a request to said identified cache memories so as to invalidate said data stored therein;

means for deleting said invalidated cache memories from the record that records to which said requested data has been sent, wherein said means for permitting an input/output channel to write said write data in a cache memory further includes means for permitting an input/output channel to write said write data in a cache memory in response to said deletion of said invalidated cache memories; and means for writing said requested write data in a disk drive.

14. A disk array system having cache memory control, comprising:

a plurality of input/output channels used for communications with a host computer;

a plurality of cache memory coupled to each of said plurality of input/output channels and used to store input/output data temporarily;

one or more disk drives;

one or more disk adapters coupled to said one or more disk drives; and one or more networks used to couple said plurality of input/output channels to said one or more disk adapters, wherein each of said plurality of input/output channels, upon receiving a data request from a host computer, writes requested write data in a cache memory and transfers said write request to said disk adapter which is coupled to disk drives which store requested data; and wherein said disk adapter includes:

means for writing said requested write data in a disk drive;

means for checking if said data requested to be written has been requested from other input/output channels before;

means for terminating processing of said data request when the check result is NO;

means for identifying cache memories to which said data requested to be written has been sent before in response to said preceding data request according a record that records to which cache memories said requested data has been sent in response to said preceding data request when said checking means has a check result of YES; and means for writing said requested write data in a disk drive.

* * * * *